Oct. 6, 1931. H. J. WICKMAN 1,826,110
VEHICLE JACK
Filed April 19, 1930
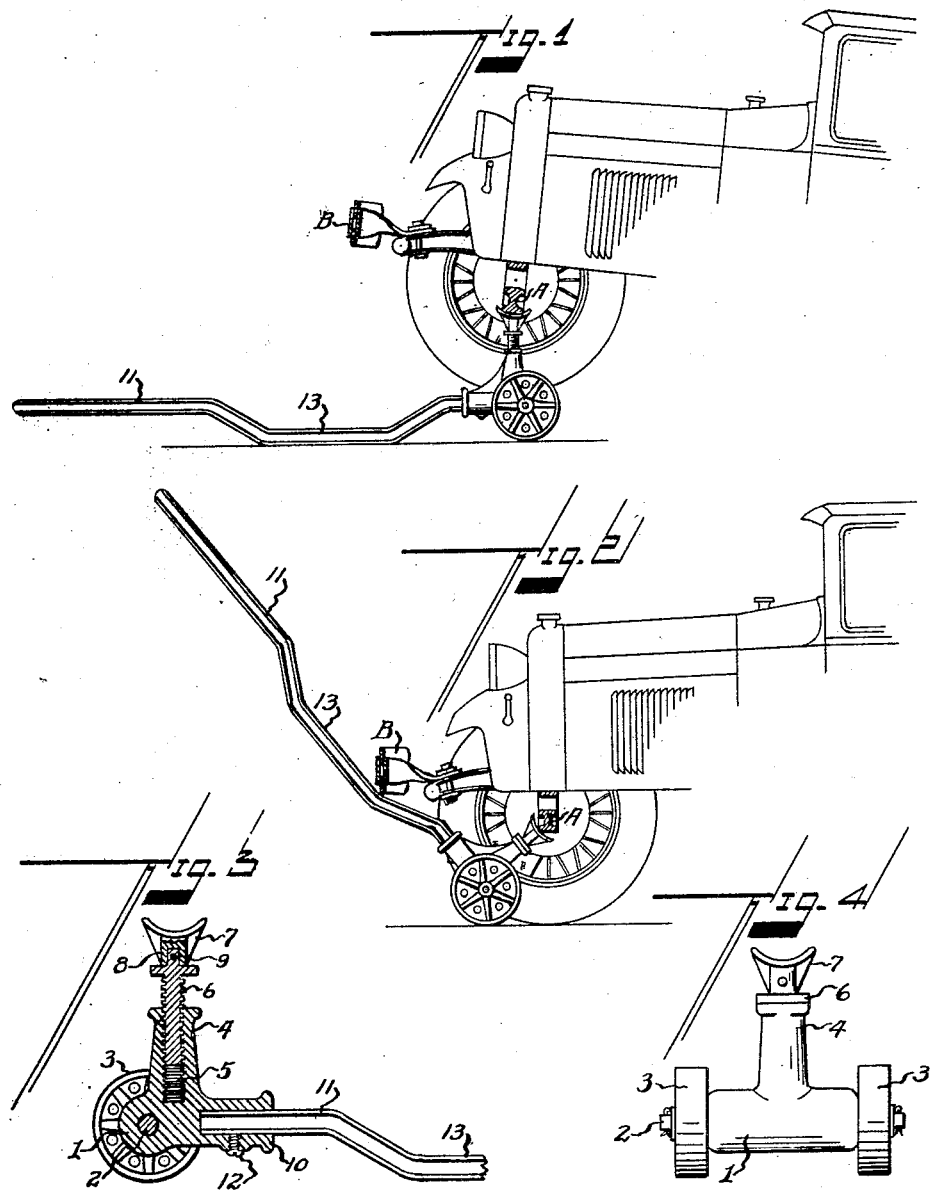
INVENTOR:
Henry J. Wickman.
BY
ATTORNEYS.

Patented Oct. 6, 1931

1,826,110

UNITED STATES PATENT OFFICE

HENRY J. WICKMAN, OF HOWELL, MICHIGAN; LEORA M. WICKMAN ADMINISTRATRIX OF SAID HENRY J. WICKMAN, DECEASED

VEHICLE JACK

Application filed April 19, 1930. Serial No. 445,575.

This invention relates to wheeled vehicle jacks of the type adapted to operate as a lever or pry in lifting the vehicle, a long hand lever being employed to turn the jack in contact with the vehicle axle and force said jack therebeneath to lift the car by a downward swinging movement of said lever; and an object of the present construction is to facilitate the placing of the jack in engagement with the vehicle axle, and to provide for adjustment of the jack to adapt it to different cars in which the distance from ground to axle varies. It is also an object to provide a construction which is such that, when the jack is in operative position with the car supported thereby, the long hand lever may be swung from side to side out of the way of the mechanic in making repairs on the car, without releasing the car, and a simple, strong and efficient construction is provided, including simple adjusting means. A further object is to secure the advantages of certain other new and useful features of the particular construction and arrangement of parts, all as hereinafter more fully set forth.

With the above and other ends in view, the invention consists in the matters hereinafter described and more particularly pointed out in the appended claim, reference being had to the accompanying drawings, in which—

Figure 1 is an illustration of the device in use and supporting the front end of an automobile in elevated position;

Fig. 2 is illustrative of the manner in which the jack is applied to the front end of an automobile and the purpose of the particular form of handle or lever;

Fig. 3 is an enlarged vertical longitudinal section through the jack; and

Fig. 4 is a front end elevation of the same.

The device as shown comprises a horizontal body 1 through which extends an axle 2 upon the projecting ends of which wheels 3 are mounted for free rotation thereon, and intermediate the ends of said body is an upwardly extending integral cylindrical hollow post or pedestal 4 having internal threads 5 for the reception of a similarly threaded screw or shaft 6.

A saddle or head 7 is formed with a socket to receive a reduced upper end 8 of the screw shaft 6, and is secured in place thereon by a transverse pin 9. This head or saddle forms a seat for the car axle A or other part to be lifted by the jack and to vary the height of this seat from the ground and make the jack applicable to the various makes of cars in which the distance from axle to ground varies, the screw shaft 6 is adjusted vertically in the bore of the pedestal 4 by turning said shaft.

Extending laterally from the body 1 with its axis substantially at right angles to the axis of the shaft 6 is an integral socket 10 to receive one end of a long hand lever or handle 11 which is held in place therein by a set screw 12.

Intermediate the socket 10 and its outer end, the handle or lever 11 is formed with an offset or lateral bend as at 13. This bend extends laterally of the lever in a downward direction or toward the ground when in a horizontal position or when the jack is rotated upon its supporting wheels 3 to bring its pedestal 4 into an upright position, as when placed beneath a car axle and the lever then turned downwardly to lift the car, as illustrated in Figure 1. In this position, with the weight of the car thereon, the lever is pressed hard against the floor or ground by this weight due to the fact that the pedestal 4 is offset on the body toward the socket 10, from the turning axis of the body or axle 2 and the lateral bend 13 is thus pushed hard against the floor by the weight of the car supported on the jack intermediate this bend and the points of contact of the wheels with the ground or floor. The operator may therefore readily grasp the free end of the lever and swing it upward to release the car as this end portion is spaced from the floor by the bend.

Most motor vehicles are provided with a bumper as indicated at B and if the lever 11 is made without the bend 13 it would be practically impossible on most cars to tilt the lever upwardly far enough to get the head 7 engaged with the car axle A and in such angular relation to the contact of the wheels with the floor, that the car would be lifted sufficiently by the prying action of the jack when the lever is swung toward the floor. The bend or offset 13 therefore serves to clear the bumper and permit a greater upward swing of the lever in placing the jack beneath a car equipped with bumpers or other parts which are in the path of such movement.

Due to the screwthreaded engagement of the shaft 6 with its post or pedestal 4, after the jack has been placed beneath the axle and the car lifted, the long lever 11 may be swung from side to side as desired to give clear floor space, without unseating the axle from its seat on the head 7, such seating holding the head and shaft against turning and the body 1 turning relative thereto upon the supporting wheels which are in rolling contact with the floor, permitting such turning of the body with ease and facility.

When the device is not in use, it will take up but little floor space as it may be stood upright, that is with its head 7 and wheels in contact with the floor and the handle 11 extending upwardly and inclined toward the pedestal and head to bring the weight past center of the axle, and thus insure its self maintenance in this upright position.

Having thus described my invention, what I claim as new is:

In a jack of the fulcrum lever type, the combination of a body, supporting ground wheels for the body forming the fulcrum of the jack, a pedestal integral with said body and extending upwardly therefrom and offset on said body laterally of the axis of said wheels, said pedestal being formed with a longitudinal internally screwthreaded bore, a load carrying screwthreaded shaft in said bore of said body free to turn therein, said body being also formed with a socket extending substantially at right angles to said bore and laterally from said body at the same side of said wheel axis as said pedestal, a head on said shaft, and a long lever handle engaged at one end in said socket and bent laterally intermediate its ends to engage the ground along said bend when said body is turned to bring said load carrying shaft into upright load carrying position and to permit said handle to be swung upwardly opposite a car bumper to a position to engage said head on said shaft, beneath a car axle.

In testimony whereof I affix my signature.

HENRY J. WICKMAN.